(12) United States Patent
Fliegl, Sr.

(10) Patent No.: US 11,064,644 B2
(45) Date of Patent: Jul. 20, 2021

(54) LIQUID MANURE SPREADER

(71) Applicant: FLIEGL AGRARTECHNIK GMBH, Mühldorf (DE)

(72) Inventor: Josef Fliegl, Sr., Kastl (DE)

(73) Assignee: FLIEGL AGRARTECHNIK GMBH, Mühldorf (DE)

(*) Notice: Subject to any disclaimer, the term of this patent is extended or adjusted under 35 U.S.C. 154(b) by 111 days.

(21) Appl. No.: 16/062,031

(22) PCT Filed: Jan. 27, 2017

(86) PCT No.: PCT/EP2017/051776
§ 371 (c)(1),
(2) Date: Jun. 13, 2018

(87) PCT Pub. No.: WO2017/129748
PCT Pub. Date: Aug. 3, 2017

(65) Prior Publication Data
US 2018/0352716 A1    Dec. 13, 2018

(30) Foreign Application Priority Data
Jan. 29, 2016   (DE) ..................... 20 2016 100 457.8

(51) Int. Cl.
*A01B 73/06*     (2006.01)
*A01C 23/00*     (2006.01)
*A01M 7/00*      (2006.01)

(52) U.S. Cl.
CPC ............ *A01B 73/065* (2013.01); *A01C 23/00* (2013.01); *A01C 23/008* (2013.01); *A01M 7/0075* (2013.01); *A01C 23/002* (2013.01)

(58) Field of Classification Search
CPC .... A01B 73/065; A01B 73/04–73/048; A01M 7/0075; A01M 7/0071;
(Continued)

(56) References Cited

U.S. PATENT DOCUMENTS 4,324,296 A * 4/1982 Schenk ................ A01B 73/044
                                                172/311
5,435,493 A * 7/1995 Houle .................. A01C 23/002
                                                239/127
(Continued)

FOREIGN PATENT DOCUMENTS

DE        29601934 U1    4/1996
DE        19703183 A1    7/1998
(Continued)

OTHER PUBLICATIONS

PCT; App. No. PCT/EP2017/051776; International Preliminary Report on Patentability and Notification of Transmittal dated Aug. 9, 2018.

(Continued)

*Primary Examiner* — Tuongminh N Pham
(74) *Attorney, Agent, or Firm* — Fitch, Even, Tabin & Flannery LLP

(57) ABSTRACT

The invention relates to a liquid manure spreader with a liquid manure spreader system, which comprises a central spreader arm and two lateral spreader arms pivotably disposed thereon, which are pivotable between a position aligned with the central spreader arm and a position oriented transversely to the central spreader arm, wherein the central spreader arm is pivotable around at least one transverse axis between a downwards folded working position and an upwards folded transport position, wherein the at least one transverse axis is translationally movably guided between a lower position and an upper position in at least one elongated hole extending in a vertical direction of the liquid manure spreader.

11 Claims, 5 Drawing Sheets

(58) Field of Classification Search
CPC .. A01M 7/0053; A01M 7/0057; A01M 7/005; A01C 23/00; A01C 23/008; A01C 23/002; A01G 25/09
See application file for complete search history.

(56) References Cited

U.S. PATENT DOCUMENTS

| | | | |
|---|---|---|---|
| 6,042,020 A | 3/2000 | Weddle | |
| 2010/0219264 A1* | 9/2010 | Meyer | A01M 7/0053 239/164 |

FOREIGN PATENT DOCUMENTS

| | | |
|---|---|---|
| DE | 19709065 A1 | 9/1998 |
| DE | 10349325 A1 | 5/2005 |
| DE | 202006008173 U1 | 9/2006 |
| DE | 202014105317 U1 | 11/2014 |
| EP | 1525784 A2 | 4/2005 |
| RU | 88908 U1 | 11/2009 |

OTHER PUBLICATIONS

PCT; App. No. PCT/EP2017/051776; International Search Report and Written Opinion dated Oct. 4, 2017.
RU; App. No. 2018122456; Decision to Grant a Patent Invention dated Feb. 20, 2019.

* cited by examiner

LIQUID MANURE SPREADER

CROSS-REFERENCE TO RELATED APPLICATIONS

This application is a U.S. national phase application filed under 35 U.S.C. § 371 of International Application Number PCT/EP2017/051776, filed Jan. 27, 2017, designating the United States, which claims benefit of German Utility Model Application No. 20 2016 100 457.8 filed on Jan. 29, 2016.

FIELD

The invention relates to a liquid manure spreader of the type specified in the preamble of claim 1.

BACKGROUND

A generic liquid manure spreader is known from DE 20 2014 105 317 U1. The liquid manure spreader shown therein includes a liquid manure barrel and a liquid manure spreader system for spreading liquid manure received in the liquid manure barrel. The liquid manure spreader system comprises a central spreader arm and two lateral spreader arms pivotably disposed thereon. The lateral spreader arms are pivotable between a position aligned with the central spreader arm and a position oriented transversely to the central spreader arm. In addition, the central spreader arm is pivotable around at least one transverse axis between a downwards folded working position and an upwards folded transport position. Thus, the lateral spreader arms can be folded out and in. Thereby, a particularly wide area can be supplied with liquid manure on the one hand and a respectively country-specific allowable maximum width of the liquid manure spreader can be satisfied in traveling on public roads on the other hand. In the downwards folded working position, the liquid manure can be supplied to the ground by means of hoses attached to the spreader arms. In the upwards folded transport position, respective hose openings of the hoses are upwards directed such that liquid manure cannot exit the hoses.

In order to be able to pivot and secure the spreading arms in the described manner at the same time, relatively expensive adjusting mechanics are required.

Therefore, it is the object of the present invention to provide a liquid manure spreader, which has a particularly large processing width and the spreader arms of which can be folded up and secured in particularly simple manner at the same time.

SUMMARY

This object is solved by a liquid manure spreader having the features of claim 1. Advantageous configurations with convenient and non-trivial developments of the invention are specified in the dependent claims.

The liquid manure spreader according to the invention includes a liquid manure spreader system comprising a central spreader arm and two lateral spreader arms pivotably disposed thereon, which are pivotable between a position aligned with the central spreader arm and a position oriented transversely to the central spreader arm, wherein the central spreader arm is pivotable around at least one transverse axis between a downwards folded working position and an upwards folded transport position. The liquid manure spreader system is preferably connected to a liquid manure barrel of the liquid manure spreader such that liquid manure received in the liquid manure barrel can be spread by means of the liquid manure spreader system, for example on an arable or a meadow.

Therein, it is provided according to the invention that the at least one transverse axis is translationally movably guided in at least one elongated hole extending in vertical direction of the liquid manure spreader between a lower position and an upper position. Thereby, the spreader arms cannot only be pivoted, but also adjusted in height. Because if the transverse axis moves upwards or downwards in the elongated hole, thus, a spreader assembly formed of the spreader arms also moves upwards or downwards. A further independent aspect of the invention additionally relates to such a liquid manure spreader system, which can be a part of a liquid manure spreader. Further, the liquid manure spreader system can be developed corresponding to the following description.

Preferably, respective receiving devices with lateral retaining elements are disposed laterally next to the liquid manure barrel, wherein respective bottom sides of the lateral spreader arms are disposed above respective top sides of the retaining elements with the transverse axis disposed in the upper position and below the top sides of the retaining elements with the transverse axis disposed in the lower position in the transport position. The receiving devices serve for receiving the lateral spreader arms when the lateral spreader arms are folded up and oriented transversely to the central spreader arm. For example, the lateral spreader arms can be pivoted such that they extend parallel to the longitudinal direction of the liquid manure barrel, thus are disposed on respective longitudinal sides of the liquid manure barrel.

In that the at least one transverse axis is translationally movably guided in at least one elongated hole extending in a vertical direction of the liquid manure spreader between a lower position and an upper position, the lateral spreader arms can be upwards lifted as far as they can be moved over the retaining elements and subsequently again be lowered. For example, the receiving devices comprise respective supporting surfaces for receiving the lateral spreader arms, which are laterally bounded by the retaining elements. The retaining elements serve as a transport lock for the folded lateral spreader arms such that they can be securely kept abutted on the receiving devices during travel. As soon as the lateral spreader arms are to be moved away from the receiving devices and folded out, the lateral spreader arms can be lifted together with the central spreader arm. Therein, the at least one transverse axis moves upwards in the elongated hole until the transverse axis has reached the topmost point of the elongated hole.

By means of the inventive solution of forming the at least one transverse axis translationally movably guided in at least one elongated hole extending in vertical direction of the liquid manure spreader between a lower position and an upper position, the lateral spreader arms can therefore be lifted and lowered in a particularly simple manner on demand.

An advantageous embodiment of the invention provides that the liquid manure spreader includes a vertical supporting frame, which comprises the elongated hole, to which at least one pivot arm is attached with an end by means of the transverse axis and connected to the central spreader arm with an opposing end. Preferably, the central spreader arm is retained pivotably on the vertical supporting frame via two pivot arms. Therein, the two pivot arms are pivotably supported via respective transverse axes, wherein the two transverse axes are guided in respective elongated holes at least substantially extending in a vertical direction of the vertical supporting frame. Thus, the pivot arms are attached to the central spreader arm with one end and to the vertical supporting frame with an opposing end. By upwards and downwards pivoting the pivot arms, thus, the central spreader arm can be pivoted upwards and downwards. Further, the pivot arms can upwards and downwards move in the elongated holes, whereby the central spreader arm and thus also the lateral spreader arms attached thereto can also be upwards and downwards moved corresponding to the length of the elongated hole.

According to a further advantageous embodiment of the invention, it is provided that at least one roller is attached to the central spreader arm, which abuts on the vertical supporting frame if the central spreader arm is in the upwards folded transport position. In the downwards folded working position, the roller is apart from the vertical supporting frame. However, if the central spreader arm is pivoted from the downwards folded working position into the upwards folded transport position, thus, the at least one roller gets in abutment on the vertical supporting frame. If the vertical supporting frame now moves upwards because the at least one transverse axis moves into the upper position in the at least one elongated hole, thus, the roller rolls on the vertical supporting frame. As a result, the central spreader arm can be upwards moved without great resistances.

In further advantageous configuration of the invention, it is provided that the liquid manure spreader includes at least one hydraulic cylinder connected to the central spreader arm or to the pivot arm for pivoting the central spreader arm between the downwards folded working position and the upwards folded transport position. By actuating the hydraulic cylinder, the central spreader arm can be pivoted and adjusted in height in simple manner, as a result of which the lateral spreader arms can also be upwards and downwards pivoted as well as adjusted in height in common with the central spreader arm.

A further advantageous embodiment of the invention provides that the lateral spreader arms are pivotable between the aligned position or the position oriented transversely to the central spreader arm by means of respective hydraulic cylinders disposed on the central spreader arm.

In addition, a further advantageous embodiment of the invention provides that the lateral spreader arms comprise rigid pipes for transporting the liquid manure, to which respective spreader containers with liquid manure outlet openings are attached. In addition, the rigid pipes have a supporting function with respect to the spreader arms. By providing the pipes or rigid pipelines, less flexible hose lines have to be provided at the liquid manure spreader system to convey the liquid manure from the liquid manure barrel e.g. to a field.

In a further advantageous configuration of the invention, it is provided that a collecting device for receiving foreign objects contained in the liquid manure is respectively disposed at the spreader containers, which includes a spring-loaded and hydraulically operable closure device. Thus, by means of the collecting device, foreign objects contained in the liquid manure can be received and removed on demand. By the spring-loaded closure device, the collecting device is kept closed until reaching a certain filling degree of the collecting device or until a certain pressure has been built up in the collecting device. In addition, the closure device can also be hydraulically opened on demand such that foreign objects received by means of the collecting device can fall out of the collecting device in simple manner.

Preferably, a shredder for shredding foreign objects contained in the liquid manure is respectively disposed at the spreader containers. Thereby, foreign objects contained in the liquid manure can be shredded in a reliable manner to prevent the spreader containers from clogging.

Finally, it is provided according to a further advantageous embodiment of the invention that a screw conveyor for conveying the foreign objects contained in the liquid manure towards the collecting device is respectively disposed in the spreader containers. Thereby, the foreign objects are separated in the collecting devices, which can preferably be hydraulically opened to empty them.

BRIEF DESCRIPTION OF THE DRAWINGS

Further advantages, features and details of the invention are apparent from the following description of preferred embodiments as well as based on the drawing. Therein, the features and feature combinations mentioned in the description as well as the features and feature combinations mentioned below in the description of figures are usable both alone and in combination with each other without departing from the scope of the invention.

The drawings show in:

FIG. 8 a further perspective view of the liquid manure spreader, wherein one of the lateral spreader arms is just being folded out and the other lateral spreader arm is still folded in.

In the figures, identical or functionally identical elements are provided with the same reference characters.

DESCRIPTION OF THE PREFERRED EMBODIMENTS

Figure 1:
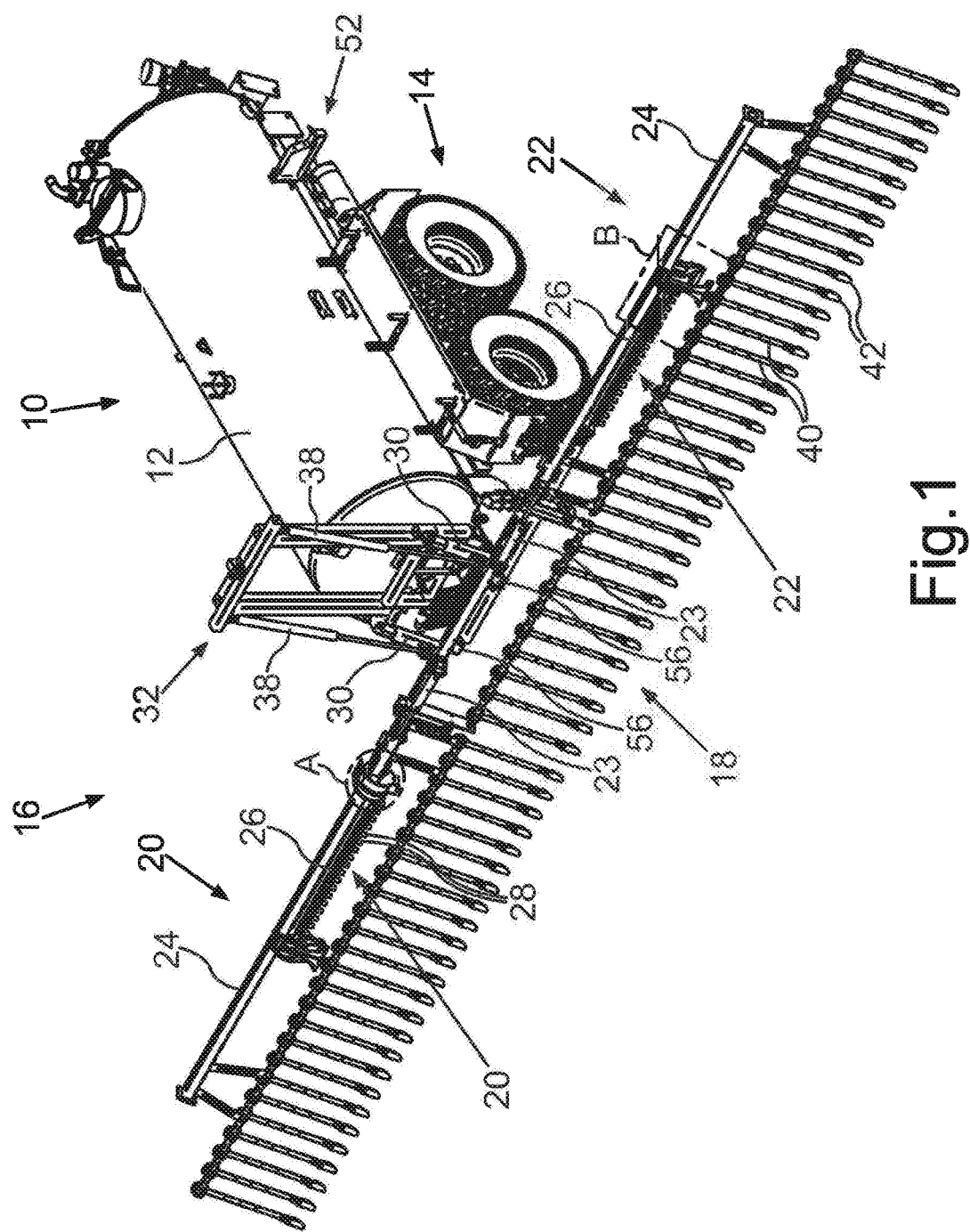
FIG. 1 a perspective view of a liquid manure spreader with a liquid manure barrel for providing liquid manure and a liquid manure spreader system, which comprises a central spreader arm and two lateral spreader arms pivotably disposed thereon, wherein the spreader arms are disposed in a folded out and downwards pivoted working position.

A liquid manure spreader overall denoted by 10 is shown in a perspective view in FIG. 1. The liquid manure spreader 10 includes a liquid manure barrel 12, which is disposed above a chassis 14. Furthermore, the liquid manure spreader 10 includes a liquid manure spreader system 16. The liquid manure spreader system 16 comprises a central spreader arm 18 and two lateral spreader arms 20, 22 pivotably disposed thereon.

Presently, the spreader arms 20, 22 are disposed in a folded out position aligned with the central spreader arm 18. The lateral spreader arms 20, 22 are attached to respective outer sides of the central spreader arm 18 by means of respective hinges not indicated in more detail. Thereby, the lateral spreader arms 20, 22 can be pivoted with respect to the central spreader arm 18 by means of respective hydraulic cylinders 23.

The lateral spreader arms 20, 22 include respective rigid pipelines 24, which can be connected to an output of the liquid manure barrel 12. Thereby, liquid manure received in the liquid manure barrel 12 can be conveyed into the pipelines 24 through hoses not illustrated in more detail here. Spreader containers 26 with a plurality of liquid manure outlet openings 28 are respectively disposed at the pipelines 24.

The central spreader arm 18 is additionally connected to a vertical supporting frame 32 via two pivot arms 30. Transverse axes 34 are passed through at respective ends of the two pivot arms 30, which are disposed in elongated holes 36, which are provided at the vertical supporting frame 32 (see FIG. 5). Two hydraulic cylinders 38 are attached to the vertical supporting frame 32 and to the pivot arms 30. By means of the hydraulic cylinders 38, the spreader arms 18, 20, 22 can be upwards pivoted from the downwards folded working position shown here into a transport position by pivoting the central spreader arm 18 around the two transverse axes 34.

In the working position, respective leaf springs 40 disposed at the spreader arms 18, 20, 22 and slot shoes 42 attached to the ends thereof face downwards. Therein, the leaf springs 40 press the slot shoes 42 to the bottom with a certain force, whereby the slot shoes 42 furrow the ground. By means of the slot shoes 42, flexible hoses not illustrated here can be received, which are connected to the liquid manure outlet openings 28 at the spreader containers 26. By means of the hoses not illustrated here and attached to the slot shoes 42, the liquid manure can then be introduced into the furrowed ground.

Figure 2:
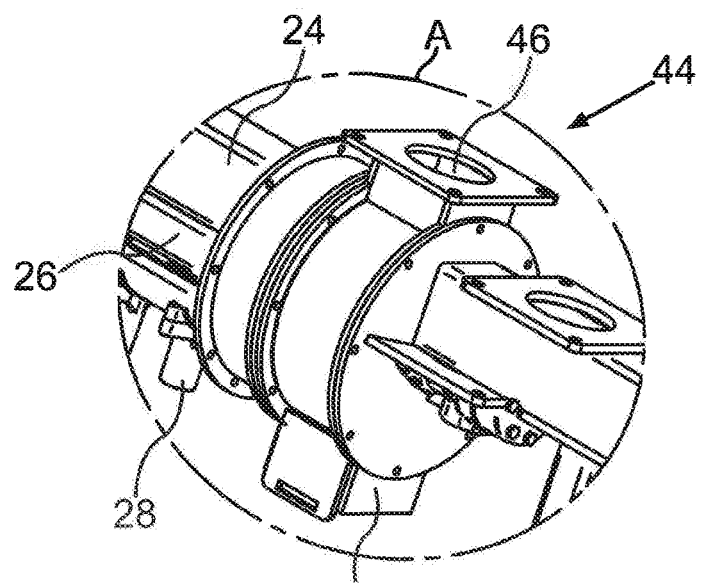
FIG. 2 a detailed view of a shredder attached to the liquid manure spreader system, by means of which foreign objects contained in the liquid manure can be shredded.

In FIG. 2, a section A indicated in FIG. 1 is shown in an enlarged representation, wherein a shredder 44 for the foreign objects contained in the liquid manure is illustrated. Through a supply opening 46 of the shredder 44, liquid manure can be supplied into the shredder 44 for example via a hose not illustrated here connected to the liquid manure barrel 12. The shredded foreign objects partially sediment in a collecting container 48 and can be removed from it.

Liquid manure passed through the shredder 44 subsequently flows through the spreader container 26 and out of the liquid manure outlet openings 28. In the two spreader containers 26 of the liquid manure spreader system 16, screw conveyors not illustrated here are disposed. The screw conveyors are preferably operated with 30 to 60 revolutions per minute and at least primarily do not have the object to spread the liquid manure, but to convey the foreign objects to the outside into respective collecting devices 50 attached to the spreader containers 26. A time relay is preferably adjusted such that the screw conveyors convey ca. 40 seconds outwards and 5 seconds inwards, thus convey the foreign objects contained in the liquid manure and arrived at the spreader containers 26 substantially longer towards the collecting devices 50 than towards the shredders 44. By the alternating conveying direction of the screw conveyors, the risk of clogging of the spreader containers 26 is reduced.

Figure 3:
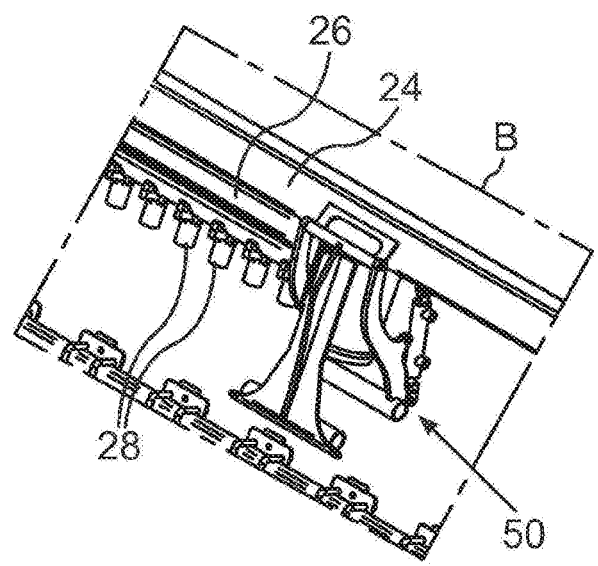
FIG. 3 a detailed view of a collecting device attached to the liquid manure spreader system for the foreign objects contained in the liquid manure.

In FIG. 3, a section B indicated in FIG. 1 is shown in an enlarged representation, wherein one of the two collecting devices 50 of the liquid manure spreader system 16 is shown. The collecting devices 50 serve for receiving foreign objects contained in the liquid manure, which have been conveyed up to the collecting devices 50 by means of the screw conveyors. The collecting devices 50 respectively include a spring-loaded and hydraulically operable closure device not indicated in more detail. The collecting devices 50 are kept closed in a spring-loaded manner up to a certain internal pressure or until they are completely filled with the foreign objects. The collecting devices 50 can be opened via hydraulic cylinders to empty them.

Figure 4:
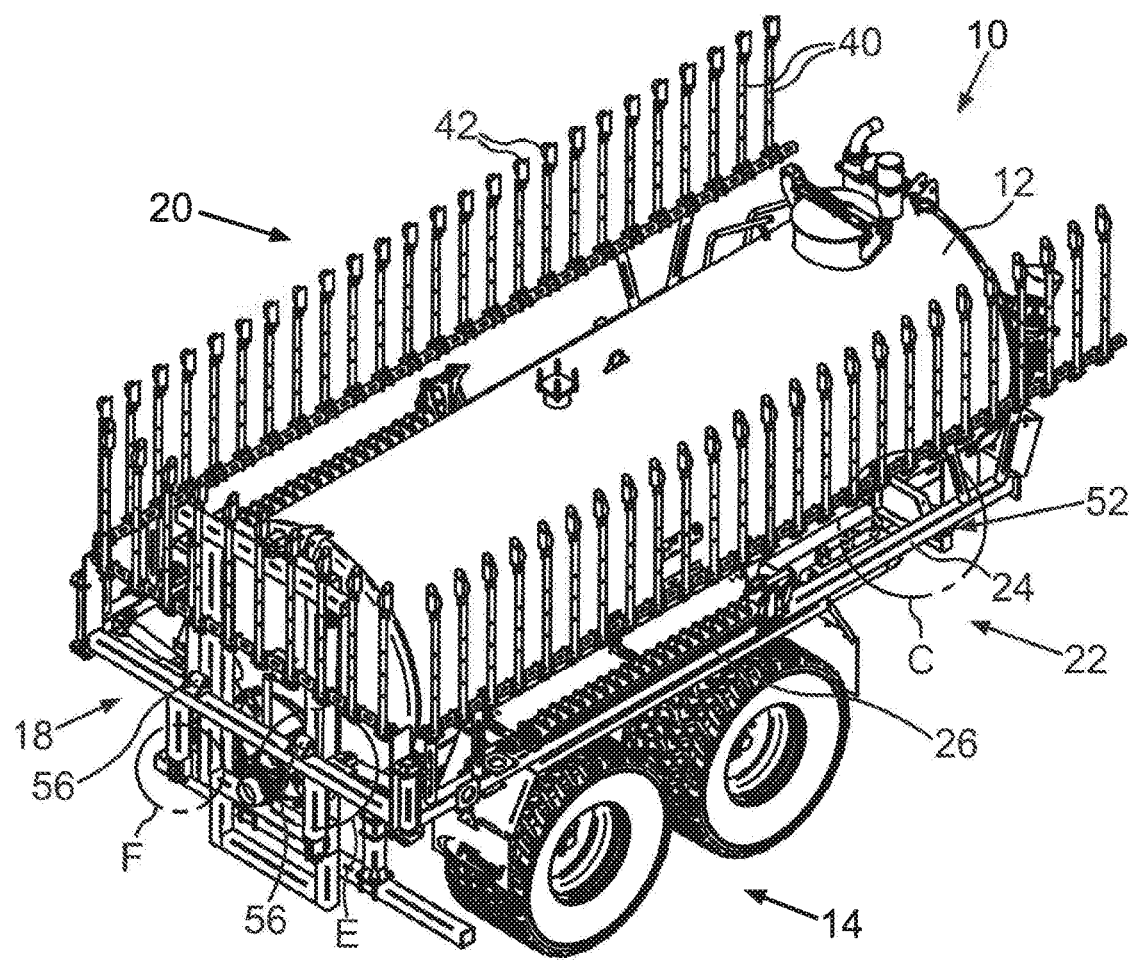
FIG. 4 a further perspective view of the liquid manure spreader, wherein the spreader arms are disposed in a folded in and upwards pivoted transport position.

In FIG. 4, the liquid manure spreader 10 is shown in a further perspective view, wherein the spreader arms 18, 20, 22 have been upwards folded into the said transport position and the lateral spreader arms 20, 22 have been folded in towards the liquid manure barrel 12. Both lateral spreader arms 20, 22 rest on respective receiving devices 52, which are disposed laterally next to the liquid manure barrel 12.

Figures 5, 6:
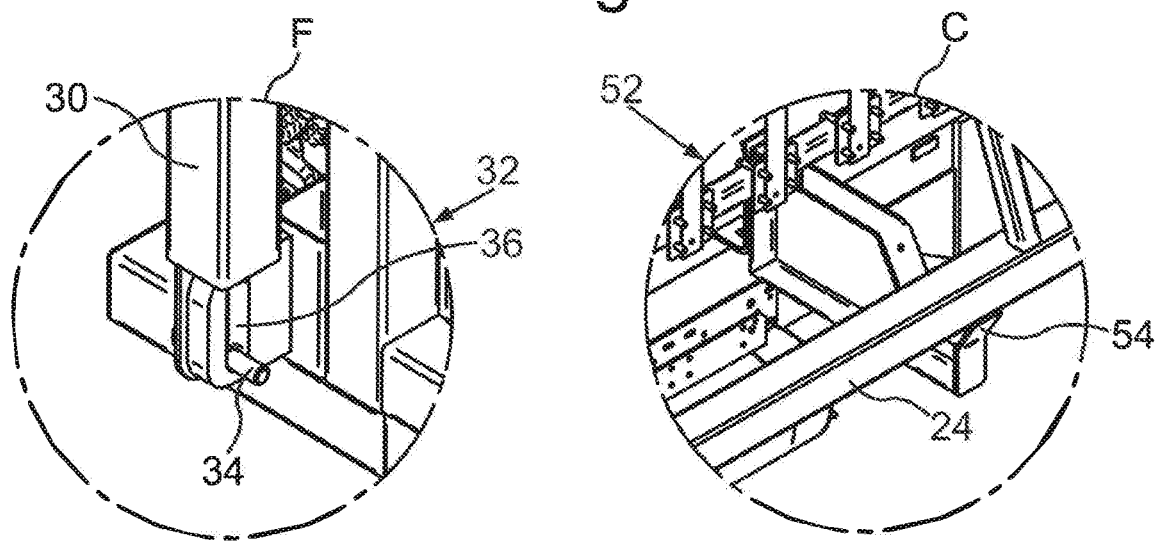
FIG. 5 a detailed view of a transverse axis disposed in a longitudinal hole, around which the central spreader arm is pivotable, wherein the transverse axis is disposed at a lower end of the elongated hole.
FIG. 6 a detailed view of a receiving device, which serves for receiving one of the lateral spreader arms when they are disposed in the folded in and upwards pivoted transport position.

In FIG. 5, a section F indicated in FIG. 4 is shown in an enlarged representation, wherein one of the already mentioned transverse axes 34 is apparent, which is guided in one of the also already mentioned elongated holes 36. If the lateral spreader arms 20, 22 have been rested against the receiving devices 52, the two transverse axes 34 are in their lowest possible position in the respective elongated holes 36.

In FIG. 6, a section C indicated in FIG. 4 is shown in an enlarged representation, wherein the receiving device 52 is shown in a perspective view. The receiving device 52 includes a lateral retaining element 54, which prevents the pipeline 24 and thus the lateral spreader arm 22 from outwards pivoting as long as the two transverse axes 34 are in their lowest possible position in the respective elongated holes 36.

Figure 7:
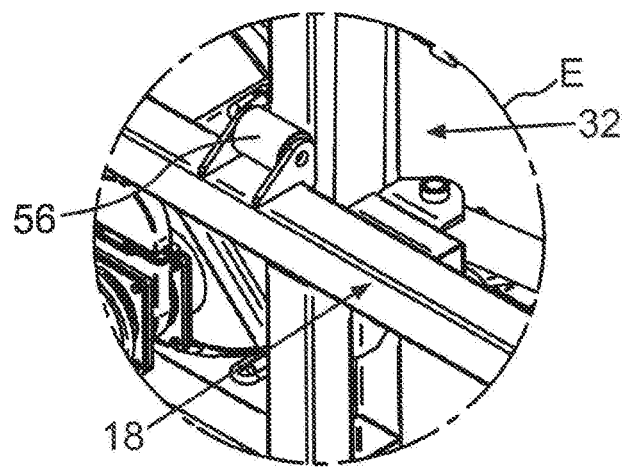
FIG. 7 a detailed view of a roller disposed at the central spreader arm, which abuts on a vertical supporting frame such that the central spreader arm can be moved up and down in a vertical direction in a particularly low-resistance manner.

In FIG. 7, a section E indicated in FIG. 4 is shown in an enlarged representation, wherein one of two rollers 56 is illustrated, which is attached to the central spreader arm 18. As soon as the central spreader arm 18 has been pivoted into the upwards pivoted transport position, the rollers 56 get into abutment on the vertical supporting frame 32. By retracting the hydraulic cylinders 38 attached to the vertical supporting frame 32, the central spreader arm 18 is upwards pivoted on the one hand and the transverse axes 34 move upwards in the elongated holes 36 on the other hand. The spreader arm 18 thereby translationally moving upwards can roll on the vertical supporting frame 32 by means of the rollers 56.

Figure 8:
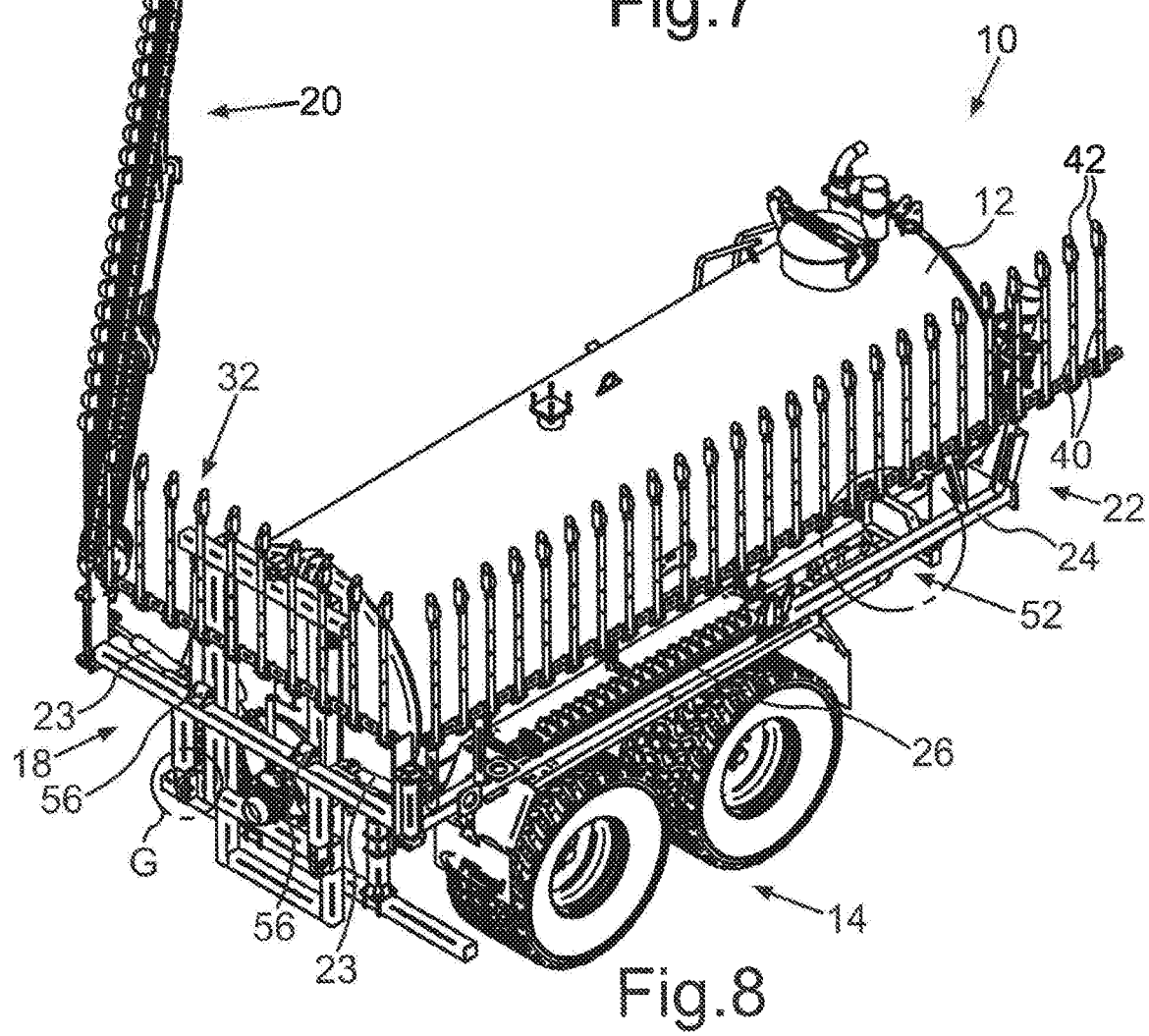

In FIG. 8, the liquid manure spreader 10 is shown in a further perspective view, wherein the left lateral spreader arm 20 is just being outwards folded and the right lateral spreader arm 22 is still folded in.

Figure 9:
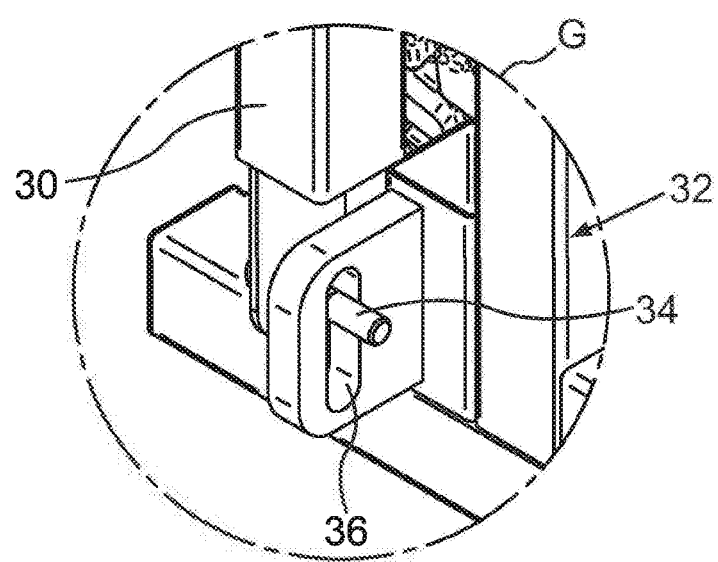
FIG. 9 a further detailed view of the transverse axis disposed in the elongated hole, wherein the transverse axis is disposed at an upper end of the elongated hole.

In FIG. 9, a section G indicated in FIG. 8 is shown in an enlarged representation, wherein the left one of the two transverse axes 34, which is guided in the left elongated hole 36, is illustrated. As is apparent, the transverse axis 34 is no longer disposed in the lowest possible position in the elongated hole 36 as in FIG. 5. Instead, the transverse axis 34 has upwards moved in the elongated hole 36 due to a corresponding operation of the hydraulic cylinders 38 disposed at the vertical supporting frame 32 and is almost in the topmost possible position in the elongated hole 36.

In that the central spreader arm 18 is connected to the transverse axes 34 by means of the two pivot arms 30, the central spreader arm 18 also correspondingly moves upwards. Since the two lateral spreader arms 20, 22 are in turn attached to the central spreader arm 18, they also move upwards corresponding to the vertical movement of the transverse axes 34 in the elongated holes 36.

As a result, the two lateral spreader arms 20, 22 translationally move upwards as far as they are no longer in the engagement area of the lateral retaining elements 54. Thereby, the lateral spreader arms 20, 22 can be moved over the lateral retaining elements 54 without problem. Thus, the lateral spreader arms 20, 22 can be very simply pivoted towards the liquid manure barrel 12 until they have been moved past the retaining elements 54. Subsequently, the lateral spreader arms 20, 22 are lowered by corresponding operation of the hydraulic cylinders 38 such that the lateral spreader arms 20, 22 rest on the receiving devices 52 and are kept from outwards pivoting away by means of the lateral retaining elements 54.

If the lateral spreader arms 18, 20 are to be pivoted open, thus pivoted away from the liquid manure barrel 12, the hydraulic cylinders 38 are retracted. Thereby, the transverse axes 34 move upwards in the elongated holes 36 and thus the lateral spreader arms 20, 22 also move upwards such that they are no longer in the engagement area of the lateral retaining elements 54 at any time. Subsequently, the lateral spreader arms 20, 22 can then be outwards pivoted by corresponding operation of the hydraulic cylinders 23 until the lateral spreader arms 20, 22 are aligned with the central spreader arm 18. Thereafter, the hydraulic cylinders 38 can be extended, whereby the spreader arms 18, 20, 22 are pivoted downwards into the working position shown in FIG. 1.

The invention claimed is:

1. A liquid manure spreader comprising:
a central spreader arm and
two lateral spreader arms pivotably disposed thereon, which are pivotable in a first direction between a position aligned with the central spreader arm and a position oriented transversely to the central spreader arm,
wherein the central spreader arm is pivotable around at least one transverse axis between a downwards folded working position and an upwards folded transport position, the central spreader arm being pivotable in a second direction that is transverse to the first direction;
wherein the at least one transverse axis is translationally movably guided between a lower position and an upper position in at least one elongated hole extending in a vertical direction of the liquid manure spreader, the transverse axis extending through and being movable within the at least one elongated hole between the lower position and the upper position.

2. A liquid manure spreader comprising:
a central spreader arm and
two lateral spreader arms pivotably disposed thereon, which are pivotable between a position aligned with the central spreader arm and a position oriented transversely to the central spreader arm,
wherein the central spreader arm is pivotable around at least one transverse axis between a downwards folded working position and an upwards folded transport position,
wherein the at least one transverse axis is translationally movably guided between a lower position and an upper position in at least one elongated hole extending in a vertical direction of the liquid manure spreader,
at least two supporting brackets each defining an indentation configured to receive each of the two lateral spreader arms therein, the at least two supporting brackets being disposed laterally next to a liquid manure barrel of the liquid manure spreader,
wherein respective bottom surfaces of the lateral spreader arms are disposed above respective top surfaces of the at least two supporting brackets with the transverse axis disposed in the upper position and below the top surfaces of the at least two supporting brackets with the transverse axis disposed in the lower position in the transport position.

3. The liquid manure spreader according to claim 1, further comprising a vertical supporting frame, which comprises the at least one elongated hole, to which at least one pivot arm is attached with one end by the transverse axis and is connected to the central spreader arm with an opposing end.

4. A liquid manure spreader comprising:
a central spreader arm and
two lateral spreader arms pivotably disposed thereon, which are pivotable between a position aligned with the central spreader arm and a position oriented transversely to the central spreader arm,
wherein the central spreader arm is pivotable around at least one transverse axis between a downwards folded working position and an upwards folded transport position,
wherein the at least one transverse axis is translationally movably guided between a lower position and an upper position in at least one elongated hole extending in a vertical direction of the liquid manure spreader,
a vertical supporting frame, which comprises the at least one elongated hole, to which at least one pivot arm is attached with one end by the transverse axis and is connected to the central spreader arm with an opposing end,
at least one roller attached to the central spreader arm, which abuts on the vertical supporting frame if the central spreader arm is in the upwards folded transport position.

5. The liquid manure spreader according to claim 3, further comprising at least one hydraulic cylinder connected to the central spreader arm or to the at least one pivot arm for pivoting the central spreader arm between the downwards folded working position and the upwards folded transport position.

6. The liquid manure spreader according to claim 1, wherein the lateral spreader arms are pivotable between the aligned position and the position oriented transversely to the central spreader arm by operation of respective hydraulic cylinders disposed at the central spreader arm.

7. The liquid manure spreader according to claim 1, wherein the lateral spreader arms comprise pipes for transporting the liquid manure, to which respective spreader containers with liquid manure outlet openings are attached.

8. A liquid manure spreader comprising:
a central spreader arm and
two lateral spreader arms pivotably disposed thereon, which are pivotable between a position aligned with the central spreader arm and a position oriented transversely to the central spreader arm, wherein the central spreader arm is pivotable around at least one transverse axis between a downwards folded working position and an upwards folded transport position, wherein the at least one transverse axis is translationally movably guided between a lower position and an upper position in at least one elongated hole extending in a vertical direction of the liquid manure spreader, wherein the lateral spreader arms comprise pipes for transporting the liquid manure, to which respective spreader containers with liquid manure outlet openings are attached, further comprising a collecting device for receiving foreign objects contained in liquid manure and respectively disposed at each of the spreader containers, the collecting device including a spring-loaded and hydraulically operable closure device.

9. The liquid manure spreader according to claim 8, further comprising a shredder for shredding foreign objects contained in the liquid manure respectively disposed at each of the spreader containers.

10. The liquid manure spreader according to claim 8, further comprising a screw conveyor for conveying the foreign objects contained in the liquid manure towards the collecting device and respectively disposed in each of the spreader containers.

11. The liquid manure spreader according to claim 1, wherein the two lateral spreader arms are each pivotable in the first direction about a respective vertical axis and the central spreader arm is pivotable in the second direction about a horizontal axis.

\* \* \* \* \*